Dec. 10, 1968  E. HENRY-BIABAUD  3,415,576
BRAKING SYSTEMS OF ARTICULATED VEHICLES
Filed May 2, 1967
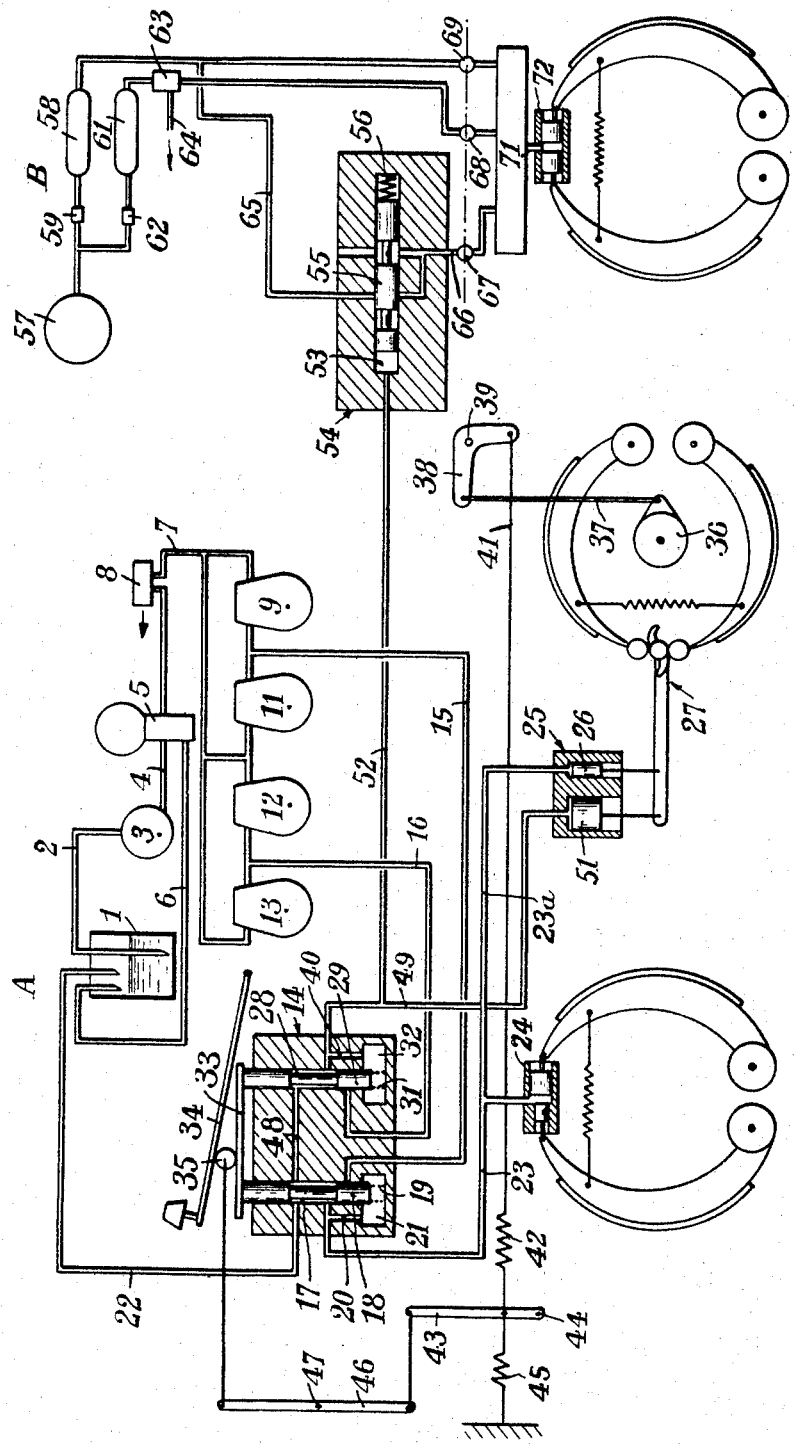

United States Patent Office 3,415,576
Patented Dec. 10, 1968

3,415,576
BRAKING SYSTEMS OF ARTICULATED VEHICLES
Edmond Henry-Biabaud, Paris, France, assignor to Societe Anonyme Andre Citroen, Paris, France, a French body corporate
Filed May 2, 1967, Ser. No. 635,483
Claims priority, application France, May 4, 1966, 60,215
1 Claim. (Cl. 303—7)

ABSTRACT OF THE DISCLOSURE

Braking system for articulated vehicles of the type comprising a tractor to which a trailer or semitrailer can be coupled, comprising a source of fluid under pressure feeding the brake cylinders of the tractor through a brake distributor, characterised in that a normally closed valve inserted in the control circuit of the trailer brakes is connected through a control pipe line to the tractor rear brake cylinder feed line so that said valve opens instantaneously when the second slide valve of the brake distributor is opened and thus controls the application of the trailer brakes before the actuation of the tractor rear axle brakes.

Background of the invention

The present invention relates to improvements in the braking systems of articulated vehicles.

Braking systems of articulated vehicles are already known which are so arranged that when the brake pedal is depressed the trailer brakes operate before the tractor brakes. In a known arrangement of this character as described and illustrated for example in the German Patent No. 762,151 the brakes of the trailer as well as those of the front and rear axle of the tractor are fed through a same and single circuit so that this system is definitely unreliable. In fact, in case of failure in the braking circuit all the brakes become inoperative and under these conditions very serious accidents are most likely to occur. Moreover, in a device of this type the tractor brakes are applied under the same conditions, whether the trailer is coupled or not thereto.

Other braking systems of articulated vehicles are also known which comprise two separate braking circuits, namely one for the tractor and one for the trailer. Another known system incorporates a brake distributor adapted to apportion the braking force among three axles, notably two axles of a tractor and one axle of a semitrailer coupled to said tractor. This brake distributor is described in the patent to E. Henry-Biabaud No. 3,284,141 issued on Nov. 8, 1966. This brake distributor comprises three slide valves of which two control the application of the tractor brakes, the third one controlling the semitrailer brakes. This distributor incorporates a first compensator bar reacting against the two slide valves controlling the actuation of the brakes mounted on the two axles of the tractor, a roller moving automatically along the first compensator bar as a function of the tractor load, and a second compensator bar acting upon said roller and also upon the third slide valve controlling the brakes of the semitrailer axle, this other compensator bar being responsive to the pressure exerted by the driver on the brake pedal.

However, the brake distributor broadly described hereinabove is unsuitable for producing the optimum brake application under all service conditions, notably introducing a time-lag in the braking effort exerted on the semitrailer brakes and on the tractor brakes.

Summary of the invention

It is the essential object of the present invention to provide a braking system for articulated vehicles which is particularly simple in design and construction, and extremely reliable in operation.

To this end, the braking system for articulated vehicles of the type comprising a tractor to which a trailer or semitrailer can be coupled, comprising a source of fluid under pressure feeding the brake cylinders of the tractor through a brake distributor comprising a compensator bar to which the effort exerted on the brake pedal is transmitted through the medium of a roller of which the position along said compensator bar is subordinate to the load carried by the rear axle of the tractor, said compensator bar acting upon a pair of parallel slide valves mounted in corresponding bores formed in the body of said brake distributor, namely a first slide valve and a second slide valve controlling respectively the delivery of fluid under pressure to the front brake cylinders and to the rear brake cylinders of the tractor, the aforesaid roller of the brake distributor being positioned nearer to the first slide valve than to the second slide valve when the rear axle is unloaded, and nearer to the second slide valve than to the first slide valve when said rear axle is loaded, that is, when the semitrailer is coupled to the tractor, is characterised in that a normally closed valve inserted in the control circuit of the trailer brakes is connected through a control pipe line to the tractor rear brake cylinder feed line so that said valve opens instantaneously when the second slide valve of the brake distributor is opened and thus controls the application of the trailer brakes before the actuation of the tractor rear axle brakes.

The braking system according to the present invention is advantageous in that it comprises a conventional brake distributor and permits of controlling the trailer brakes by resorting to a particularly simple modification of the tractor braking circuit. When the rear axle is loaded, that is, when the trailer is coupled, the second slide valve, which opens when the driver depresses the brake pedal, will firstly open the valve controlling the supply of brake fluid to the trailer brakes. Then the front brakes of the tractor are supplied through the first slide valve and finally the rear brakes of the tractor are actuated. Under these conditions, the trailer is braked first, the front axle and finally the rear axle being subsequently braked.

Brief description of the invention

In order to afford a clearer understanding of this invention and of the manner in which the same may be carried out in practice, a typical form of embodiment thereof will now be described with reference to the single figure of the accompanying drawing showing a general diagram of the braking system of this invention.

Description of the preferred embodiment

The braking system comprises essentially, in this specific form of embodiment, a hydraulic circuit A for the tractor brakes and a pneumatic circuit B for the trailer or semitrailer brakes. This pneumatic circuit B may be of the vacuum type, as shown in the drawing, or of the compressed-air type.

The hydraulic braking circuit of the tractor comprises a fluid reservoir 1 supplying hydraulic fluid through a pipe line 2 to a high-pressure pump 3 delivering fluid under pressure through a pipe line 4 to a main accumulator 5 connected through a return pipe line 6 to the main reservoir 1. This main accumulator 5 is connected, through another pipe line 7 having inserted therein a minimum-pressure pick-up device 8 connected to a tell-tale lamp (not shown), to a set of four accumulators 9, 11, 12 and 13. These four accumulators are connected in turn to a brake distributor 14, accumulators 9 and 11 being connected in common through a pipe line 15, and accumulators 12 and 13 through a common pipe line 16. Pipe line 15 leads into a first bore 17 formed in the body of the brake distributor 14, in which a first slide valve 18 is slidably mounted. This slide valve 18 is constantly urged upwards, as seen in the figure, by a spring 19 housed in a chamber 21 into which projects one end of said slide valve 18. In the inoperative or closed position of slide valve 18, as shown in the drawing, this slide valve permits the communication between a pipe line 22 constituting a return path to reservoir 1 and another pipe line 23 communicating with chamber 21 of distributor 14 through a duct 20; this pipe line 23 is further connected to the front brakes of the tractor, which are shown diagrammatically in the drawing in the form of a single brake drum cylinder 24, and also through another pipe line 23a to a bore of relatively small cross-sectional area of each rear brake cylinder 25 in which a small piston 26 of corresponding diameter is slidably mounted and adapted to actuate the rear brake control mechanism shown in diagrammatic form at 27.

The brake distributor 14 is also provided with another bore 28 parallel to bore 17 and receiving a second slide valve 29. This second slide valve 29 is normally urged to its inoperative or closed position, that is, in an uppermost position as seen in the drawing, by a spring 31 housed in a chamber 32 formed in the body of brake distributor 14, the end of slide valve 29 projecting into this chamber, as shown. A compensator bar 33 bears with its underface against the upper ends of slide valves 18 and 29, and the brake pedal is adapted to depress this compensator bar 33 through the medium of a roller 35 of which the position along this compensator bar 33 is adjustable as a function of the load carried by the rear axle of the tractor.

The load-responsive corrector mechanism is of a type well known per se and is therefore shown only diagrammatically in the drawing. It comprises, as seen from the rear axle 36, a rod 37 attached to this rear axle and to a bell-crank lever 38 fulcrumed at 39 on the tractor frame, a cable or wire 41 anchored with the interposition of a spring 42 to said bell-crank lever 38 and to another two-armed lever 43 fulcrumed at 44 on the tractor frame, and also a third two-armed lever 46 fulcrumed at 47 on the tractor frame, as shown, this third lever 46 having its lower end attached to the upper end of lever 43 and its upper end attached to the aforesaid roller 35. In the drawing the roller 35 is in the position corresponding to the unloaded condition of said rear axle, that is, when the trailer is not coupled to the tractor, and as shown in this position the roller 35 is nearer to slide valve 18 than to slide valve 29.

A return duct 48 connected to reservoir 1 opens into the bore 28 of distributor body 14; in the closed or inoperative position of slide valve 29 this duct 48 communicates with a pipe line 49 communicating in turn through a duct 40 with chamber 32. This pipe line 49 is connected to a large-sectioned bore of each rear brake cylinder 25, which has slidably mounted therein a piston 51 of corresponding large diameter controlling the rear brake mechanism 27.

Branched off the aforesaid pipe line 49 is another pipe line 52 opening into a bore 53 of a normally closed valve 54 inserted in the trailer braking circuit B. This valve 54 comprises a movable slide-valve member 55 urged by a spring 56 to its inoperative or closed position in which it is shown in the drawing. The vacuum-type braking circuit B illustrated herein is well known per se and comprises essentially a vacuum generator 57 (which may be a vacuum pump in the case of a diesel engine or the induction manifold or pipe in the case of a spark-ignition engine). This vacuum generator 57 is connected to a pair of parallel-arranged vacuum reservoirs or cylinders, namely a main reservoir 58 through a non-return valve 59 and an auxiliary vacuum reservoir 61 through a non-return valve 62. The trailer braking circuit further comprises an emergency brake valve 63 responsive to a mechanical control member 64 connected to the handbrake, said valve 63 being connected to the outlet of the auxiliary reservoir 61. The brake control valve 54 is connected through a pipe line 65 to the main vacuum reservoir 58, and an outlet pipe line 66 is connected to a connecting union 67 leading directly to the trailer brakes. A second connecting union 68 is connected to the outlet of the emergency brake valve 63, and a third connecting union 69 is connected directly to the main reservoir 58 to permit the automatic operation. These three unions 67, 68 and 69 are connected to a device 71 controlling the trailer brake cylinders 72 when the trailer is coupled to the tractor.

The operation of the braking system of this invention will now be described. Assuming first that the trailer is not coupled to the tractor and that, therefore, the rear axle of the tractor is unloaded, under these conditions the roller 35 of the load apportioning device or distributor is positioned as shown in the drawing. When the brake pedal 34 is depressed, the resultant effort is transmitted through the roller 35 and apportioned by the compensator bar 33 among the pair of parallel slide valves 18 and 29. Due to the extreme-left position of roller 35, slide valve 18 will slide first in its bore 17 to open the communication between the pipe lines 15 and 23. In this case, the pressure in accumulators 9 and 11 is transmitted via pipe lines 15, 23 and 23a to the front brake cylinders 24 and also to the small-sectioned bores of the rear brake cylinders 25. Therefore, the greater part of the braking effort is applied to the front axle, and a reduced braking effort is applied to the rear axle through the small piston 26 actuating the brake control mechanism 27.

On the other hand, if the trailer is coupled to the tractor, that is, if the rear axle of the latter is loaded, the load corrector mechanism comprising the aforesaid elements 37 to 47 will automatically shift the roller 35 to the right, that is, to a position in which roller 35 is nearer to slide valve 29 than to slide valve 18.

Under these conditions, when the brake pedal 34 is depressed the right-hand slide valve 29 is moved against the resistance of its return spring 31. The downward movement of slide valve 29 as seen in the drawing is attended by the opening of the communication between pipe line 16 on the one hand and pipe lines 49, 52 on the other hand. Thus, pressure fluid is transmitted from accumulators 12 and 13 via pipe line 52 to chamber 53 of valve 54, whereby the slide valve member 55 thereof is moved to the right, as seen in the drawing. Then the valve 54 opens instantaneously, thus opening the communication between pipe lines 65 and 66. The device 71 controlling the trailer brake cylinders 72 is thus connected to the main vacuum reservoir 58, so that the trailer brakes are applied.

The first slide valve 18 also opens to provide a communication between pipe lines 15 and 23 to energize the front brake cylinders 24.

The pressure in accumulators 12 and 13 is also transmitted to pipe line 49 and therefore to the large-sectioned bores of the rear-axle brake cylinders 25. The large-diameter piston 51 of each cylinder 25 is thus actuated to operate the rear brake control mechanism 27.

Since the valve 54 opens immediately when fluid under pressure is supplied to pipe line 52, as contrasted with the device 27 of which the actuation takes place at a slower rate, it is clear that the trailer brakes are applied first, the rear brakes of the tractor being applied only subsequently.

Therefore, when the driver depresses the brake pedal, the trailer, the front axle of the tractor and finally the rear axle of the tractor are braked in this order and successively.

Thus, notably, the trailer braking system may be of the compressed-air type instead of the vacuum type illustrated. In this case the vacuum control valve 54 is replaced by an air valve, and a compressor is substituted for the source of vacuum 57.

Similarly, the braking system according to this invention is also applicable to other types of brakes, notably to drum brakes of different designs, or disk brakes.

Finally, the basic principles of the braking system of this invention is also applicable to those cases in which the tractor braking circuit is of the pneumatic type.

According to a possible modified form of embodiment, the rear brake cylinders 25 may comprise only one bore having slidably mounted therein a pair of tandem pistons acting in opposition and of same cross-sectional dimension. In this case, pipe line 23a is dispensed with.

What I claim is:

1. A braking system for articulated vehicle consisting of a tractor having two axles and a trailer having a single axle, said system comprising a first pipe line and a second pipe line for supplying a compressed hydraulic fluid, a compressed hydraulic fluid distributor having a first reaction slide valve and a second reaction slide valve connected to said first and second hydraulic fluid supply pipe lines, respectively, and to first and second compressed hydraulic fluid pipe line of which the corresponding slide valves are each adapted when their movement exceeds a predetermined limit value, to control the passage of an hydraulic fluid compressed at a pressure proportional to the force causing the movement of the relevant slide valve, braking members associated with each one of the two tractor axles and connected to said first compressed fluid distributing pipe line, complementary braking members associated with the rear axle of said tractor and connected to said second compressed fluid distributing pipe line, a pipe line mounted on said trailer for supplying compressed air under motive pressure, a valve connected to said trailer air pipe line and to a pipe line for distributing air compressed under motive pressure, a valve member slidably mounted in said valve, a return spring constantly urging said slide valve member to the position in which it closes the inlet to said pipe line for distributing air compressed under motive pressure, members for actuating the trailer brakes, means for connecting said trailer brake actuating members to said pipe line distributing air compressed under motive pressure, a branch line in said second compressed fluid distributing pipe which is connected to said last-named valve to control the opening thereof when compressed fluid is allowed to flow through said second compressed fluid pipe line, a yoke bar covering both of said compressed hydraulic fluid distributor slide valves, a roller disposed on said yoke and adapted to apportion among the two slide valves the effort exerted by the driver of the articulated vehicle during a brake application, means for automatically adjusting the position of said roller on said yoke in a manner responsive to the trailer's weight by moving said roller to a position close enough to said first slide valve to permit the operative depression of said first slide valve alone when said trailer is not coupled to the tractor and to a position nearer to said second slide valve when said trailer is coupled to the tractor.

References Cited

UNITED STATES PATENTS

| 2,652,904 | 9/1953 | Whitten | 303—7 |
| 2,976,084 | 3/1961 | Brueder | 303—22 XR |
| 3,284,141 | 11/1966 | Henry-Biabaud | 303—7 |

MILTON BUCHLER, *Primary Examiner.*

JOHN J. McLAUGHLIN, *Assistant Examiner.*

U.S. Cl. X.R.

303—2, 22, 40, 53